(12) United States Patent
Takahashi

(10) Patent No.: US 10,191,695 B2
(45) Date of Patent: Jan. 29, 2019

(54) IMAGE FORMING APPARATUS CAPABLE OF MAKING BOOKLET, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yasuhiro Takahashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/057,483

(22) Filed: Mar. 1, 2016

(65) Prior Publication Data

US 2016/0266852 A1   Sep. 15, 2016

(30) Foreign Application Priority Data

Mar. 11, 2015   (JP) .................................. 2015-048184

(51) Int. Cl.
G06K 15/00 (2006.01)
G06F 3/12 (2006.01)
H04N 1/00 (2006.01)

(52) U.S. Cl.
CPC .......... *G06F 3/1208* (2013.01); *G06F 3/1205* (2013.01); *G06F 3/1252* (2013.01);
(Continued)

(58) Field of Classification Search
CPC ............. G03G 15/5016; G03G 15/502; G03G 15/6538; G03G 15/6541; G03G 15/6544; G03G 15/36; G06F 3/125; G06F 3/1253; G06F 3/1256; G06F 3/1258; G06F 3/1208; G06F 3/1205; G06F 3/1252;
(Continued)

(56) References Cited

U.S. PATENT DOCUMENTS 6,002,849 A    12/1999  Koh et al.
7,424,237 B2 *  9/2008  Ushio .................... G03G 15/36
                                                    399/408

(Continued)

FOREIGN PATENT DOCUMENTS

JP           923329 A    1/1997
JP      2007281830 A   10/2007
JP      2008011024 A    1/2008

*Primary Examiner* — Dov Popovici
(74) *Attorney, Agent, or Firm* — Rossi, Kimms & McDowell LLP

(57) ABSTRACT

An image forming apparatus that is capable of obtaining a booklet of a correct opening direction. A reading unit reads a spread of an original and generates image data of a plurality of pages. A first receiving unit receives an opening direction of the original from a user as a setting about reading of the original. A storage unit stores the image data of the plurality of pages in association with information showing the opening direction that the first receiving unit receives. A second receiving unit receives an opening direction of printed matter from the user as a setting about printing of the image data stored in the storage unit. An indication unit indicates the opening direction that the information stored in the storage shows to the user when the second receiving unit receives the opening direction of the printed matter.

7 Claims, 14 Drawing Sheets

(52) U.S. Cl.
CPC ......... *G06F 3/1253* (2013.01); *H04N 1/0032* (2013.01); *H04N 1/00204* (2013.01); *H04N 1/00411* (2013.01); *H04N 1/00806* (2013.01); *H04N 1/00811* (2013.01); *H04N 2201/0094* (2013.01)

(58) Field of Classification Search
CPC ........... H04N 1/00482; H04N 1/00408; H04N 1/0044; H04N 1/00442; H04N 1/00461; H04N 1/00453; H04N 1/00456; H04N 1/00466; H04N 1/387; H04N 1/32464; H04N 1/00681; H04N 1/00726; H04N 1/00721; H04N 1/00204; H04N 1/0032; H04N 1/00411; H04N 1/00806; H04N 1/00811; H04N 2201/0094
See application file for complete search history.

(56) References Cited

U.S. PATENT DOCUMENTS

| | | | |
|---|---|---|---|
| 7,747,185 B2 * | 6/2010 | Kimoto | G03G 15/502 399/81 |
| 2007/0211264 A1 * | 9/2007 | Hoshino | H04N 1/00408 358/1.1 |
| 2014/0309095 A1 * | 10/2014 | Kuranoshita | B65H 43/00 493/405 |

* cited by examiner

SELECT LOCATION OF FILE TO BE USED

| BOX NUMBER | NAME | USAGE |
|---|---|---|
| 00 | COMMON SPACE | 10 % |
| 01 | INDIVIDUAL A | 10 % |
| 02 | INDIVIDUAL B | 5 % |
| 03 | INDIVIDUAL C | 25 % |
| 04 | INDIVIDUAL D | 0 % |

SELECT FILE, DESIGNATE PURPOSE OF USE

| NAME | SHEET SIZE | NUMBER OF PAGES |
|---|---|---|
| 201410171005 | A3 | 2 |
| 201410201315 | A4 | 8 |

1301

IMAGE FORMING APPARATUS CAPABLE OF MAKING BOOKLET, CONTROL METHOD THEREFOR, AND STORAGE MEDIUM STORING CONTROL PROGRAM THEREFOR

BACKGROUND OF THE INVENTION

Field of the Invention

The present invention relates to an image forming apparatus that is capable of making a booklet, a control method therefor, and a storage medium storing a control program therefor.

Description of the Related Art

There is a known image forming apparatus that makes a booklet (hereinafter a "pre-rebinding booklet") by applying a saddle stitch bookbinding process using staples to an original bundle that consists of a plurality of originals (for example, see Japanese Laid-Open Patent Publication (Kokai) No. 09-023329 (JP 09-023329A)). Moreover, the image forming apparatus disclosed in this publication generates a plurality of image data corresponding to a plurality of originals, which are obtained from a pre-rebinding booklet by removing staples, by reading the originals one by one, prints the generated image data on sheets, and makes a new booklet (hereinafter referred to as a "post-rebinding booklet") by applying the saddle stitch bookbinding process using staples to the sheets on which the image data are printed.

Specifically, the image forming apparatus in JP 09-023329A reads eight originals (FIG. 20A) that are obtained by separating a pre-rebinding booklet and to which page numbers of 1 to 8 are given, and prints the image data of the read originals on a front side and a back side of a sheet (hereinafter referred to as a "first bookbinding sheet") and a front side and a back side of another sheet (hereinafter referred to as a "second bookbinding sheet").

For example, the original of the page number 8 is printed in a left half of the front side of the first bookbinding sheet, the original of the page number 1 is printed in the right half of the front side of the first bookbinding sheet, the original of the page number 2 is printed in a left half of the back side of the first bookbinding sheet, and the original of the page number 7 is printed in the right half of the back side of the first bookbinding sheet (FIG. 20B). Moreover, the original of the page number 6 is printed in a left half of the front side of the second bookbinding sheet, the original of the page number 3 is printed in the right half of the front side of the second bookbinding sheet, the original of the page number 4 is printed in a left half of the back side of the second bookbinding sheet, and the original of the page number 5 is printed in the right half of the back side of the second bookbinding sheet (FIG. 20C).

As a result, the first bookbinding sheet in which the original of the page number 2 is printed in the back of the original of the page number 1 and the original of the page number 8 is printed in the back of the original of the page number 7 is obtained (FIG. 20D). The second bookbinding sheet in which the original of the page number 4 is printed in the back of the original of the page number 3 and the original of the page number 6 is printed in the back of the original of the page number 5 is obtained (FIG. 20E). Next, the first bookbinding sheet and the second bookbinding sheet are superimposed and are double-folded so that the back side of the first bookbinding sheet faces to the front side of the second bookbinding sheet. And when the saddle stitch bookbinding process is applied using staples, a left-opening post-rebinding booklet will be obtained (FIG. 20F).

Incidentally, there is a right-opening booklet (FIG. 21) other than the above-mentioned left-opening booklet. For example, when a pre-rebinding booklet is a left-opening booklet, a post-rebinding booklet must be a left-opening booklet. In the same manner, when a pre-rebinding booklet is a right-opening booklet, a post-rebinding booklet must be a right-opening booklet. When the right-opening post-rebinding booklet is obtained from the left-opening pre-rebinding booklet, spread pages (FIG. 22B) of the post-rebinding booklet differ from spread pages (FIG. 22A) of the pre-rebinding booklet.

A user needs to set up an opening direction of a post-rebinding booklet in order to obtain the post-rebinding booklet of which an opening direction is the same as that of a pre-rebinding booklet.

However, when the user sets the opening direction of the post-rebinding booklet for a while after separating the pre-rebinding booklet, the user may erroneously set up the opening direction of the post-rebinding booklet that is different from the opening direction of the pre-rebinding booklet because the user forgets the opening direction of the pre-rebinding booklet. In this case, since the post-rebinding booklet is bound in the opening direction that is different from the opening direction of the pre-rebinding booklet, there is a problem that the post-rebinding booklet of the correct opening direction cannot be obtained.

SUMMARY OF THE INVENTION

The present invention provides an image forming apparatus, a control method therefor, and a storage medium storing a control program therefor, which are capable of obtaining a booklet of a correct opening direction.

Accordingly, a first aspect of the present invention provides an image forming apparatus comprising a reading unit configured to read a spread of an original and to generate image data of a plurality of pages, a first receiving unit configured to receive an opening direction of the original from a user as a setting about reading of the original, a storage unit configured to store the image data of the plurality of pages generated by the reading unit according to the opening direction received by the first receiving unit in association with information showing the opening direction that the first receiving unit receives, a second receiving unit configured to receive an opening direction of printed matter from the user as a setting about printing of the image data stored in the storage unit, and an indication unit configured to indicate the opening direction that the information stored in the storage shows to the user when the second receiving unit receives the opening direction of the printed matter.

Accordingly, a second aspect of the present invention provides a control method for an image forming apparatus comprising a reading step of reading a spread of an original and to generate image data of a plurality of pages, a first receiving step of receiving an opening direction of the original from a user as a setting about reading of the original, a storing step of storing the image data of the plurality of pages generated in the reading step according to the opening direction received in the first receiving step in association with information showing the opening direction received in the first receiving step, a second receiving step of receiving an opening direction of printed matter from the user as a setting about printing of the image data stored in the storing step, and an indication step of indicating the opening direction that the information stored in the storing step shows to the user when receives the opening direction of the printed matter is received in the second receiving step.

Accordingly, a third aspect of the present invention provides a non-transitory computer-readable storage medium storing a control program causing a computer to execute the control method of the second aspect.

According to the present invention, the booklet of the correct opening direction can be obtained.

Further features of the present invention will become apparent from the following description of exemplary embodiments with reference to the attached drawings.

BRIEF DESCRIPTION OF THE DRAWINGS

FIG. 12 is a view showing a box selection screen displayed on the touch panel display unit when a box-printing-process button in the main menu screen in FIG. 4 is pressed.

FIG. 13 is a view showing a data list screen displayed on the touch panel display unit when a box choice in the box selection screen in FIG. 12 is selected.

DESCRIPTION OF THE EMBODIMENTS

Hereafter, embodiments according to the present invention will be described in detail with reference to the drawings.

Figure 1:
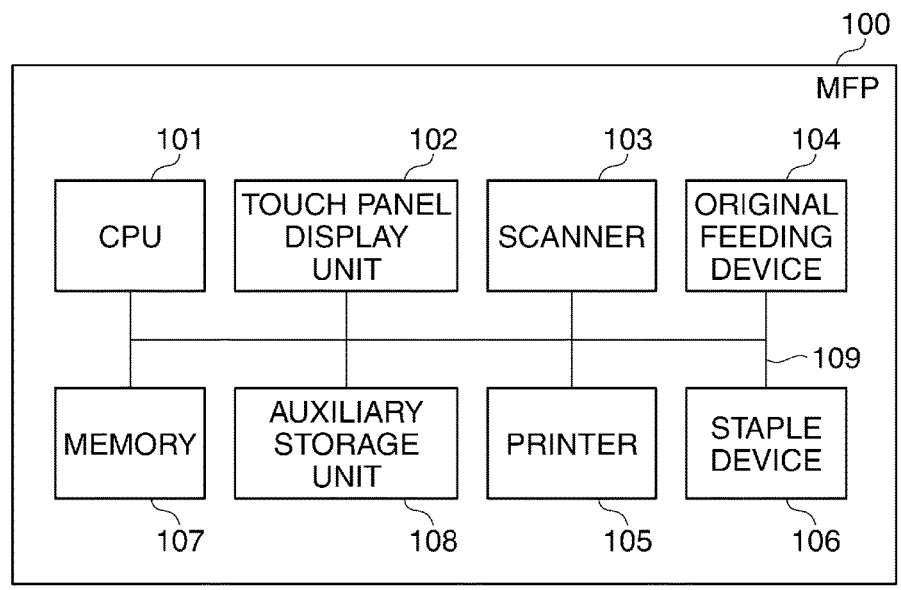
FIG. 1 is a block diagram schematically showing an internal configuration of an MFP as an image forming apparatus according to an embodiment of the present invention.

FIG. 1 is a block diagram schematically showing an internal configuration of an MFP 100 as an image forming apparatus according to an embodiment of the present invention.

The MFP 100 in FIG. 1 is provided with a CPU 101, a touch panel display unit 102, a scanner 103, an original feeding device 104, a printer 105, a staple device 106, a memory 107, and an auxiliary storage unit 108. These components are mutually connected through an internal bus 109.

The CPU 101 runs a program developed to the memory 107, and controls each component of the MFP 100. The touch panel display unit 102 receives an instruction from a user, and displays a response content against an instruction from a user. The scanner 103 reads a spread of an original and generates image data corresponding to a plurality of pages of the original concerned. The original feeding device 104 conveys an original to the scanner 103. Moreover, the original feeding device 104 reverses the original once conveyed on the scanner 103, and conveys it to the scanner 103 again. The printer 105 prints the image data that the scanner 103 generates to a recording sheet, such as a recording paper sheet.

The staple device 106 binds a bundle of recording sheets printed by the printer 105 with staples. The memory 107 stores the data etc. that is used for executing a program. The auxiliary storage unit 108 is a large capacity storage device, such as a hard disk drive, and stores image data generated by the scanner 103 and various programs executed by the CPU 101.

Figure 2:
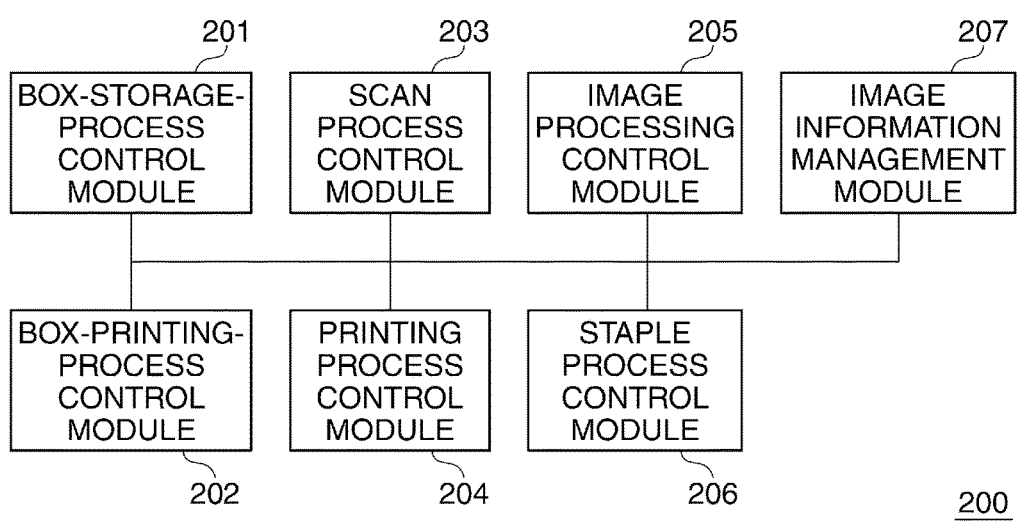
FIG. 2 is a block diagram schematically showing a configuration of software executed by a CPU shown in FIG. 1.

FIG. 2 is a block diagram schematically showing a configuration of software 200 executed by the CPU 101 shown in FIG. 1.

The software 200 in FIG. 2 is provided with a box-storage-process control module 201, a box-printing-process control module 202, a scan process control module 203, a printing process control module 204, an image processing control module 205, a staple process control module 206, and an image information management module 207.

The box-storage-process control module 201 controls a process that stores image data generated by the scanner 103 into the auxiliary storage unit 108. The box-printing-process control module 202 controls a process that prints the image data that the box-storage-process control module 201 controls the storing process among the image data stored in the auxiliary storage unit 108. The scan process control module 203 controls a process that the scanner 103 reads an original and generates image data.

The printing process control module 204 controls a process that the printer 105 prints image data. The image processing control module 205 controls the various image processes applied to image data. The staple process control module 206 controls a process that binds a plurality of recording sheets on which image data are printed with staples. The image information management module 207 manages information about image data stored in the auxiliary storage unit 108.

Figure 3:
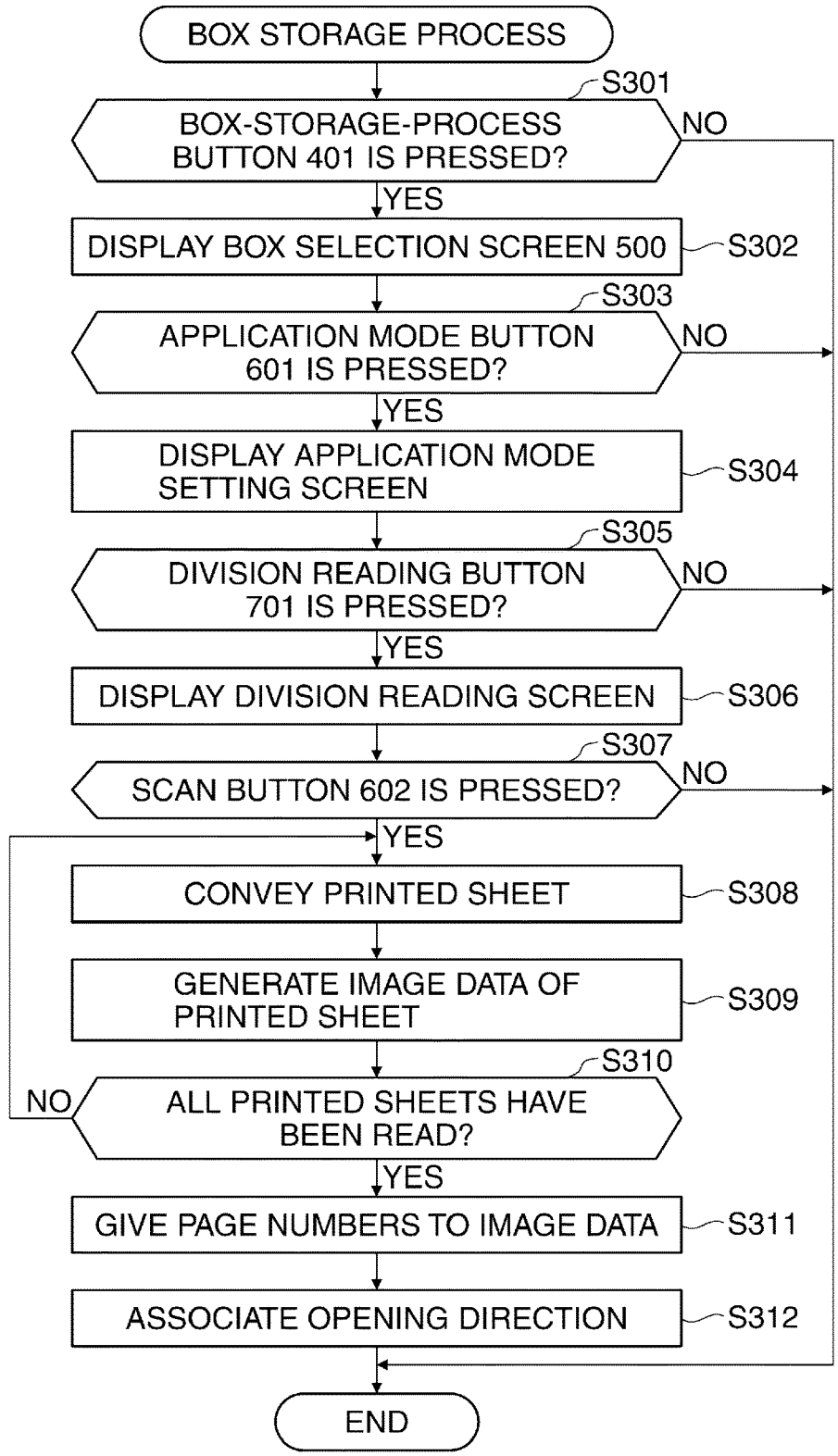
FIG. 3 is a flowchart showing procedures of a box storage process executed by the CPU shown in FIG. 1.

FIG. 3 is a flowchart showing procedures of a box storage process executed by the CPU 101 shown in FIG. 1. When the process in FIG. 3 is performed, a plurality of sets of image data corresponding to original pages of printed recording sheets (hereinafter referred to as "printed sheets") that are separated from a left-opening pre-rebinding booklet (a first booklet) to which the saddle stitch bookbinding process was applied are stored into the auxiliary storage unit 108, for example. It is assumed that the pre-rebinding booklet consists of two printed sheets and each of the printed sheets includes four pages on which four originals are respectively printed. Moreover, the pre-rebinding booklet shall be a left-opening booklet that is obtained by applying the saddle stitch bookbinding process to the printed sheets.

Figure 4:
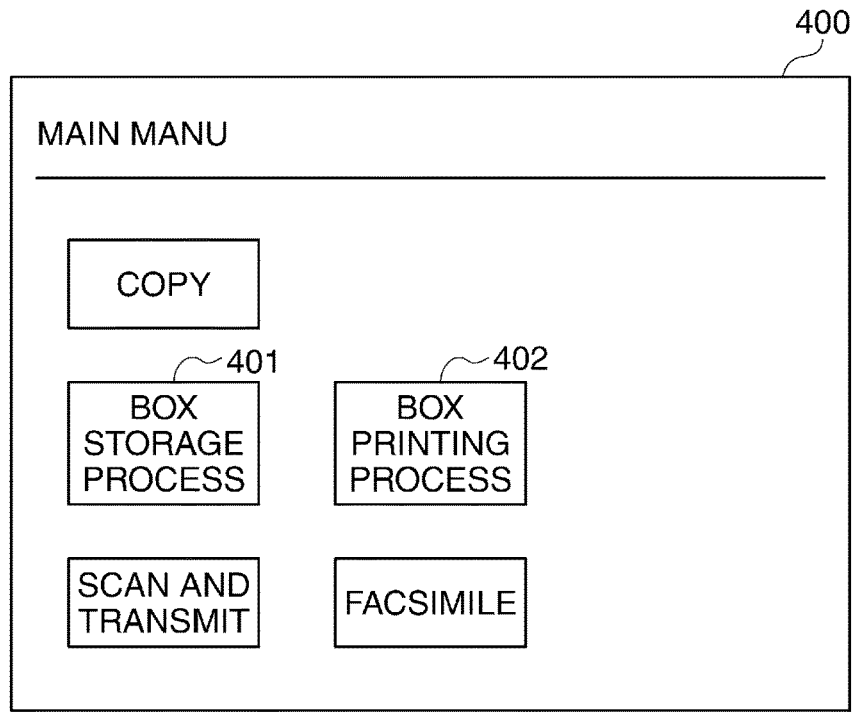
FIG. 4 is a view showing a main menu screen displayed on a touch panel display unit shown in FIG. 1.
Figure 5:
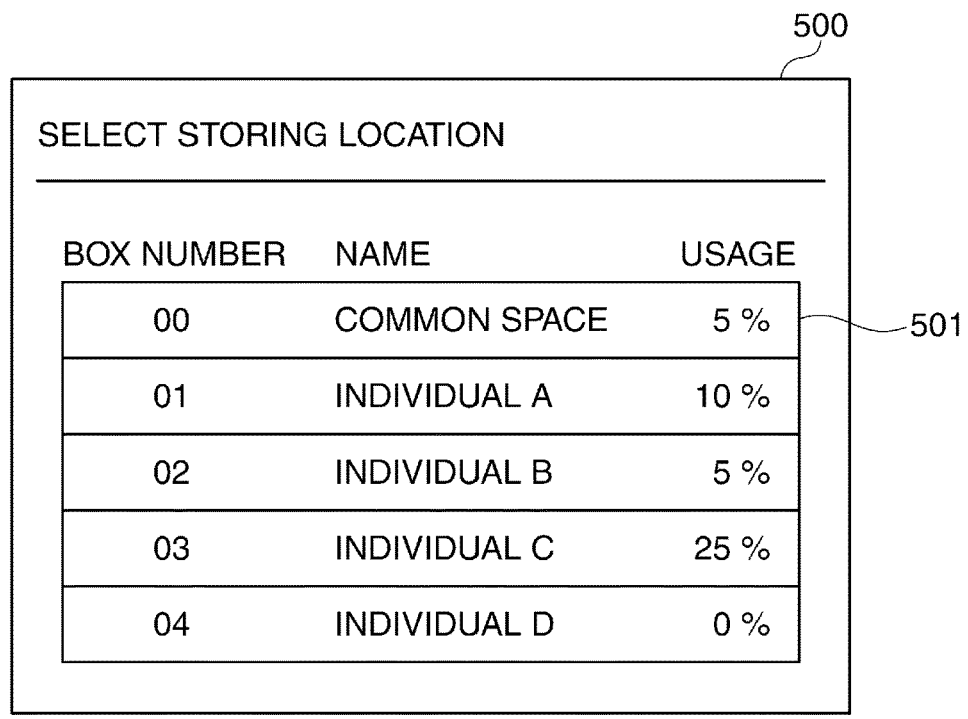
FIG. 5 is a view showing a box selection screen displayed on the touch panel display unit when a box-storage-process button in the main menu screen in FIG. 4 is pressed.

As shown in FIG. 3, a main menu screen 400 (FIG. 4) is displayed on the touch panel display unit 102, and it is determined whether a box-storage-process button 401 in the main menu screen 400 is pressed (step S301). As a result of the determination in the step S301, when the box-storage-process button 401 is not pressed, this process finishes. When the box-storage-process button 401 is pressed, a box selection screen 500 (FIG. 5) is displayed on the touch panel display unit 102 (step S302) in order to select a storing location (hereinafter referred to as a "box") into which the image data generated by the scanner 103 is stored. In this case, a box choice 501 corresponding to a box of the box number 00 in the box selection screen 500 shall be selected.

Figure 6:
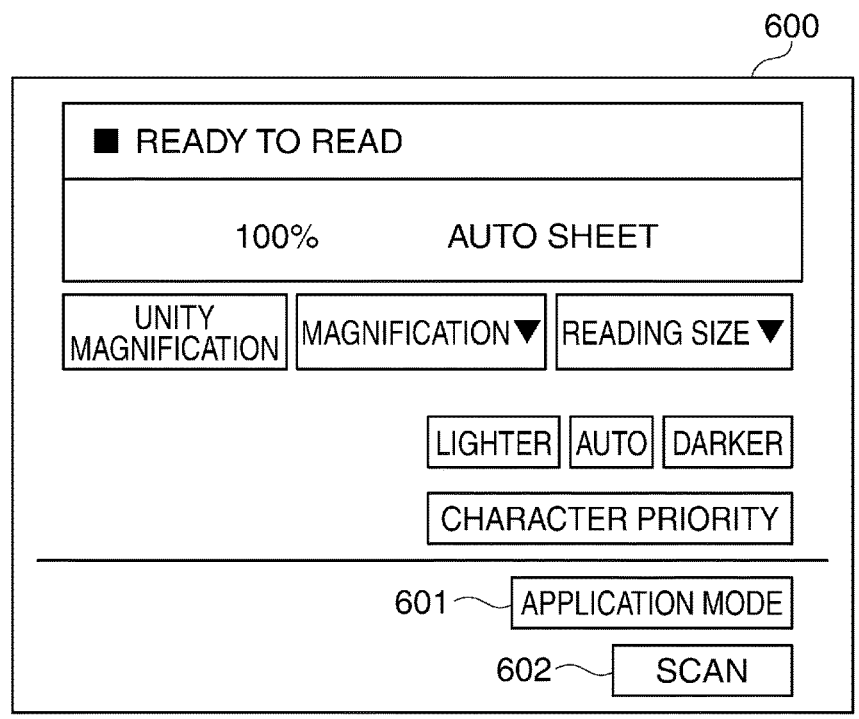
FIG. 6 is a view showing a setting screen displayed on the touch panel display unit in FIG. 1.
Figure 7:
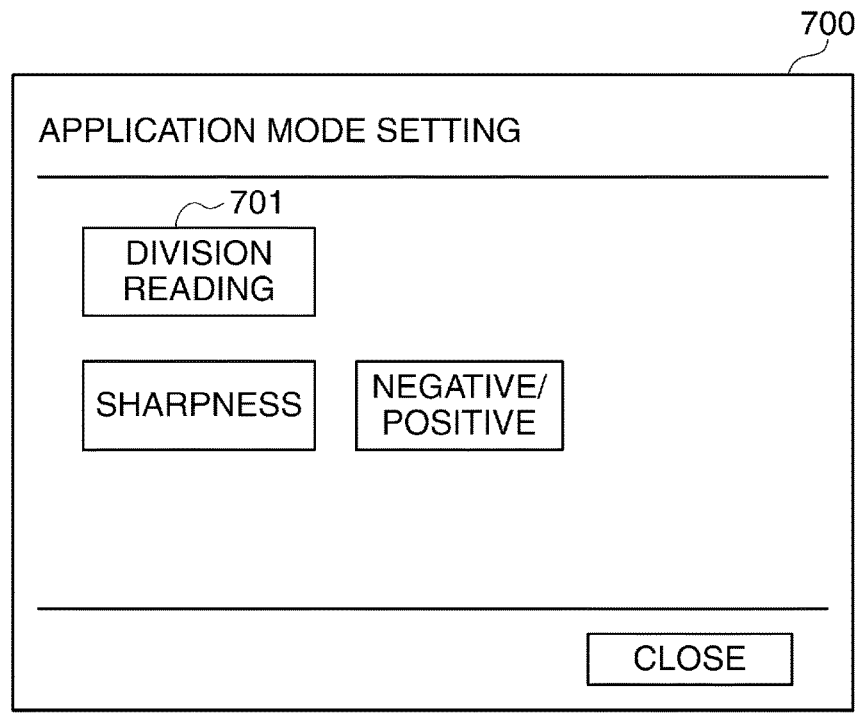
FIG. 7 is a view showing an application mode setting screen displayed on the touch panel display unit when an application mode button in the setting screen in FIG. 6 is pressed.

Next, a setting screen 600 (FIG. 6) is displayed on the touch panel display unit 102 in order to set up conditions for reading originals in pages with the scanner 103, and it is determined whether an application mode button 601 in the setting screen 600 is pressed (step S303). As a result of the determination in the step S303, when the application mode button 601 is not pressed, this process finishes. When the application mode button 601 is pressed, an application mode setting screen 700 (FIG. 7) is displayed on the touch panel display unit 102 (step S304), and it is determined whether a division reading button 701 in the application mode setting screen 700 is pressed (step S305).

Figure 8:
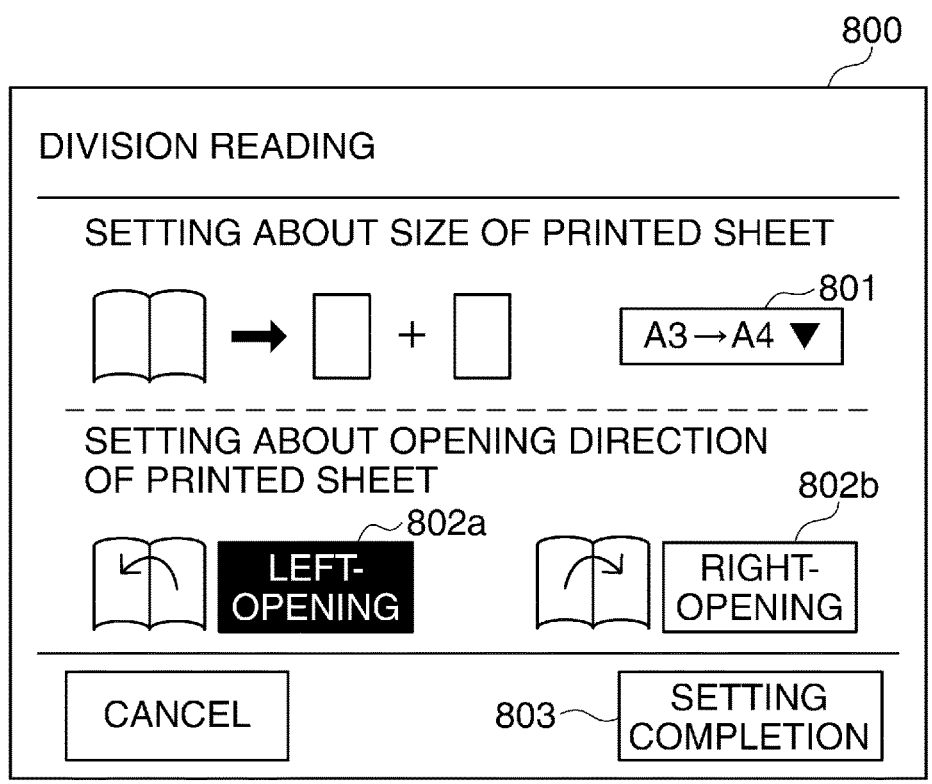
FIG. 8 is a view showing a division reading screen displayed on the touch panel display unit when a division reading button in the application mode setting screen in FIG. 7 is pressed.

As a result of the determination in the step S305, when the division reading button 701 is not pressed, this process finishes. When the division reading button 701 is pressed, a division reading screen 800 (FIG. 8) is displayed on the touch panel display unit 102 (step S306).

The division reading screen 800 is provided with a pull-down menu 801, selection buttons 802*a* and 802*b*, and a setting completion button 803. For example, when "A3->A4" is displayed on the pull-down menu 801, originals printed on pages of an A3-size printed sheet are read as A4-size originals. Moreover, the selection buttons 802*a* and 802*b* show information about directions in which a booklet opens (hereinafter referred to as "opening directions"). A user checks the opening direction of the pre-rebinding booklet that is separated into a plurality of printed sheets, and presses the selection button 802*a* or the selection button 802*b*.

When the pre-rebinding booklet is a left-opening booklet, the selection button 802*a* is pressed. When the pre-rebinding booklet is a right-opening booklet, the selection button 802*b* is pressed. In this case, the left-opening shall be set up as the opening direction because the selection button 802*a* is pressed. When the setting completion button 803 is pressed, the setting screen 600 is displayed on the touch panel display unit 102 again.

Referring back to FIG. 3, when the selection button 802*b* in the division reading screen 800 is pressed and the setting completion button 803 is pressed, the setting screen 600 is again displayed on the touch panel display unit 102, and it is determined whether the scan button 602 in the setting screen 600 is pressed (step S307).

As a result of the determination in the step S307, when the scan button 602 is not pressed, this process finishes. When the scan button 602 is pressed, the original feeding device 104 conveys one printed sheet, which was separated from the pre-rebinding booklet, to the scanner 103 (step S308). The scanner 103 reads the originals in the right half page and the left half page of the front side of the conveyed printed sheet, and generates the image data corresponding to the pages concerned. Next, the original feeding device 104 reverses the conveyed printed sheet. The scanner 103 reads the originals in the right half page and the left half page of the back side of the reversed printed sheet, and generates the image data corresponding to the pages concerned, and the CPU 101 stores the generated image data into the auxiliary storage unit 108 (step S309).

Figure 9A:
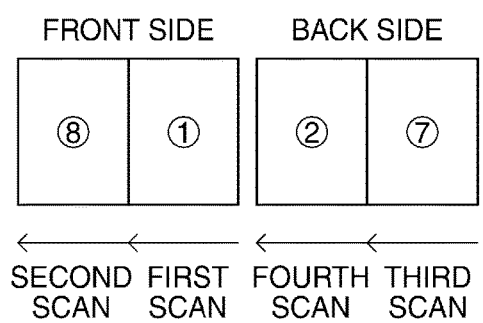
FIG. 9A and FIG. 9B are views showing a reading procedure for reading originals constituting a left-opening pre-rebinding booklet to which a saddle stitch bookbinding process is given in step S309 in FIG. 3.

Specifically, when the originals printed on eight pages on the two printed sheets separated from the left-opening pre-rebinding booklet to which the saddle stitch bookbinding process is applied (FIG. 9A and FIG. 9B) are read, the original in the right half page (the page number 1) of the front side of the first printed sheet is read, and then the original in the left half page (the page number 8) of the front side of the first printed sheet is read. Next, after the first printed sheet is reversed, the original in the right half page (the page number 7) of the back side of the first printed sheet is read, and the original in the left half page (the page number 2) of the back side of the first printed sheet is read (FIG. RA).

Figure 9B:
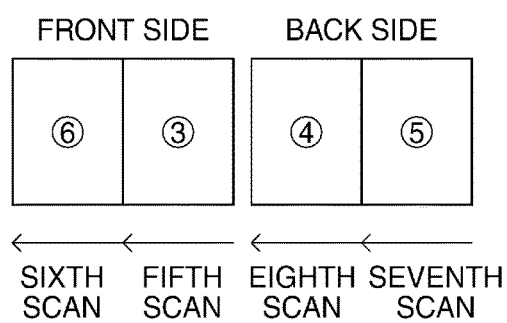

Next, the original in the right half page (the page number 3) of the front side of the second printed sheet is read, and the original in the left half page (the page number 6) of the front side of the second printed sheet is read. Then, after the second printed sheet is reversed, the original in the right half page (the page number 5) of the back side of the second printed sheet is read, and the original in the left half page (the page number 4) of the back side of the second printed sheet is read (FIG. 9B).

When the originals printed on eight pages on the two printed sheets separated from the right-opening pre-rebinding booklet to which the saddle stitch bookbinding process is applied (FIG. 10A and FIG. 10B) are read, the original in the right half page (the page number 8) of the front side of the first printed sheet is read, and then the original in the left half page (the page number 1) of the front side of the first printed sheet is read.

Figure 10A:
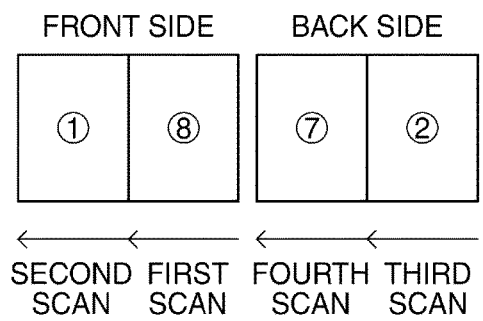
FIG. 10A and FIG. 10B are views showing a reading procedure for reading originals constituting a right-opening pre-rebinding booklet to which the saddle stitch bookbinding process is given in step S309 in FIG. 3.
Figure 10B:
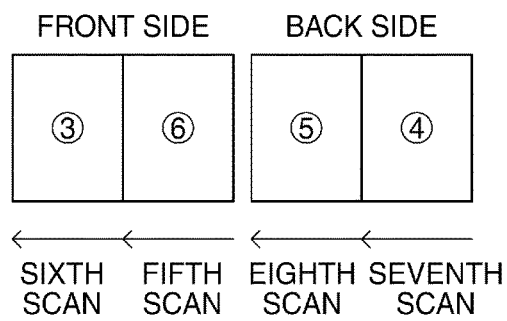

Next, after the first printed sheet is reversed, the original in the right half page (the page number 2) of the back side of the first printed sheet is read, and the original in the left half page (the page number 7) of the back side of the first printed sheet is read (FIG. 10A). Then, the original in the right half page (the page number 6) of the front side of the second printed sheet is read, and the original in the left half page (the page number 3) of the front side of the second printed sheet is read. Then, after the second printed sheet is reversed, the original in the right half page (the page number 4) of the back side of the second printed sheet is read, and the original in the left half page (the page number 5) of the back side of the second printed sheet is read (FIG. 10B).

Referring back to FIG. 3, it is determined whether all the printed sheets separated from the pre-rebinding booklet have been read (step S310). As a result of the determination in the step S310, when not all the printed sheets have been read, the process returns to the step S308. When all the printed sheets have been read, page numbers are given to the image data corresponding to the originals stored in the auxiliary storage unit 108 (step S311).

Specifically, the page number is given on the basis of the timing at which the original of the page corresponding to the image data was read. For example, when the set-up opening direction is left-opening, the image data read at (4n−3)th timing corresponds to the page number (2n−1), the image data read at (4n−2)th timing corresponds to the page number (4N−2n+2), the image data read at (4n−1)th timing corresponds to the page number (4N−2n+1), and image data read at 4n-th timing corresponds to the page number 2n, where "N" denotes the total number of the printed sheets and "n" denotes the order of the printed sheet conveyed to the scanner 103.

When the set-up opening direction is right-opening, the image data read at (4n−3)th timing corresponds to the page number (4N−2n+2), the image data read at (4n−2)th timing corresponds to the page number (2n−1), the image data read at (4n−1)th timing corresponds to the page number 2n, and image data read at 4n-th timing corresponds to the page number (4N−2n+1), where "N" denotes the total number of the printed sheets and "n" denotes the order of the printed sheet conveyed to the scanner 103.

After that, the booklet opening direction selected and set up with the selection button 802a or 802b is associated to the image data of the originals stored in the auxiliary storage unit 108 (step S312), and this process finishes.

According to the process in FIG. 3, the booklet opening direction selected and set up with the selection button 802a or 802b is associated to the original pages stored in the auxiliary storage unit 108 (step S312). In the process in FIG. 3, since the original pages of the printed sheets separated from the pre-rebinding booklet are read and the image data corresponding to the original pages are stored into the auxiliary storage unit 108 after the user sets up the booklet opening direction with the selection buttons 802a and 802b, the user is able to check the original pages before reading and recognize the opening direction of the pre-rebinding booklet. Accordingly, a user never sets up the opening direction that does not correspond to the opening direction of the pre-rebinding booklet.

Figure 11:
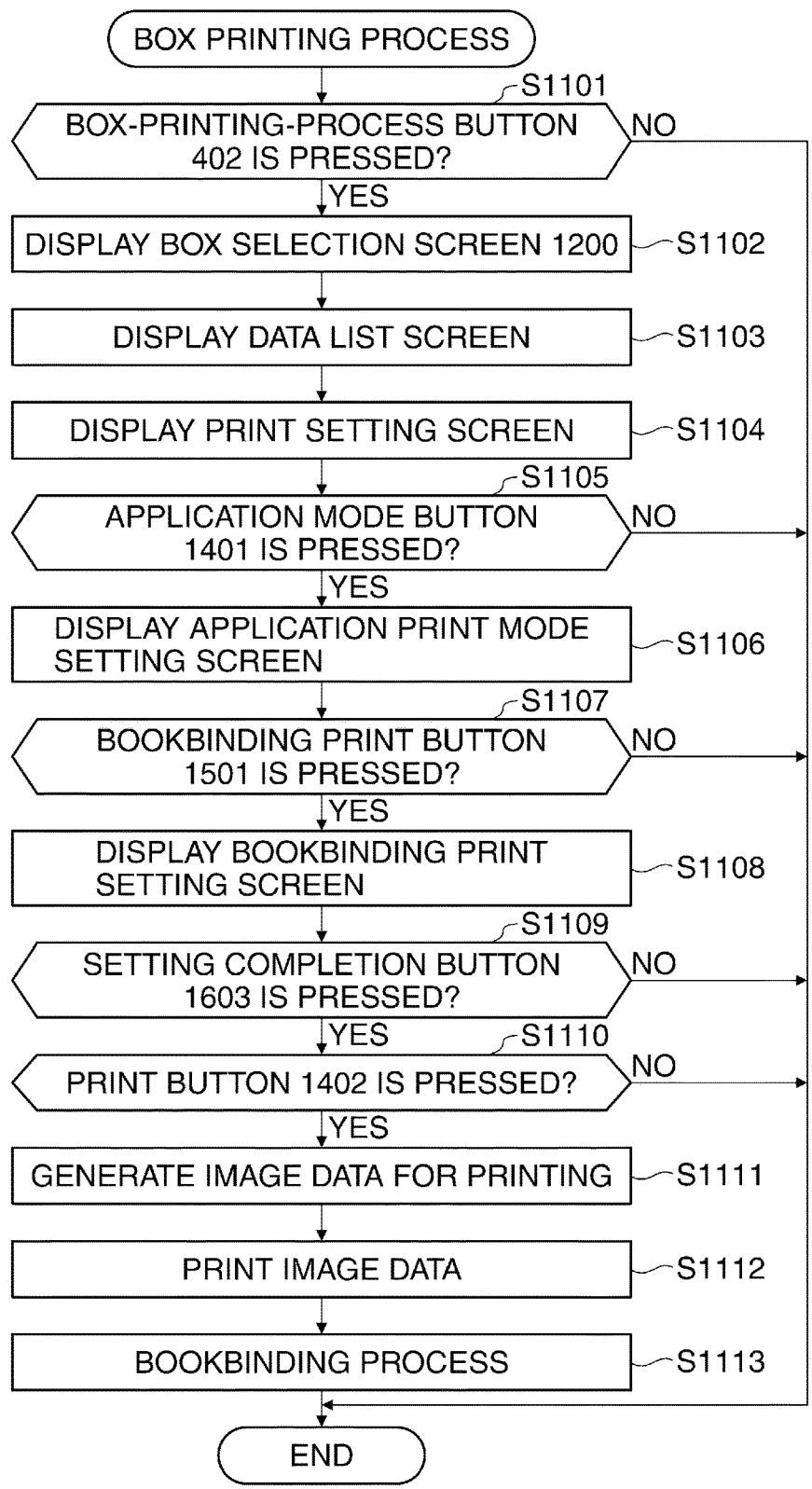
FIG. 11 is a flowchart showing procedures of a box printing process executed by a CPU shown in FIG. 1.

FIG. 11 is a flowchart showing procedures of a box printing process executed by the CPU 101 shown in FIG. 1. When the process in FIG. 11 is performed, the image data stored in the auxiliary storage unit 108 in the box storage process in FIG. 3 are printed, and a post-rebinding booklet (printed matter, a second booklet) of which an opening direction is the same as the opening direction of the pre-rebinding booklet is obtained.

As shown in FIG. 11, the main menu screen 400 is displayed on the touch panel display unit 102, and it is determined whether a box-printing-process button 402 in the main menu screen 400 is pressed (step S1101). As a result of the determination in the step S1101, when the box-printing-process button 402 is not pressed, this process finishes. When the box-printing-process button 402 is pressed, a box selection screen 1200 (FIG. 12) is displayed on the touch panel display unit 102 (step S1102). In this case, a box choice 1201 corresponding to the box of the box number 00 in the box selection screen 1200 shall be selected. Next, a data list screen 1300 (FIG. 13) that shows the image data stored in the box of the box number 00 is displayed on the touch panel display unit 102 (step S1103). In this case, data 1301 in the data list screen 1300 shall be selected. The data 1301 shall be the image data of the originals to which the booklet opening direction set up in the step S312 was associated.

Figure 14:
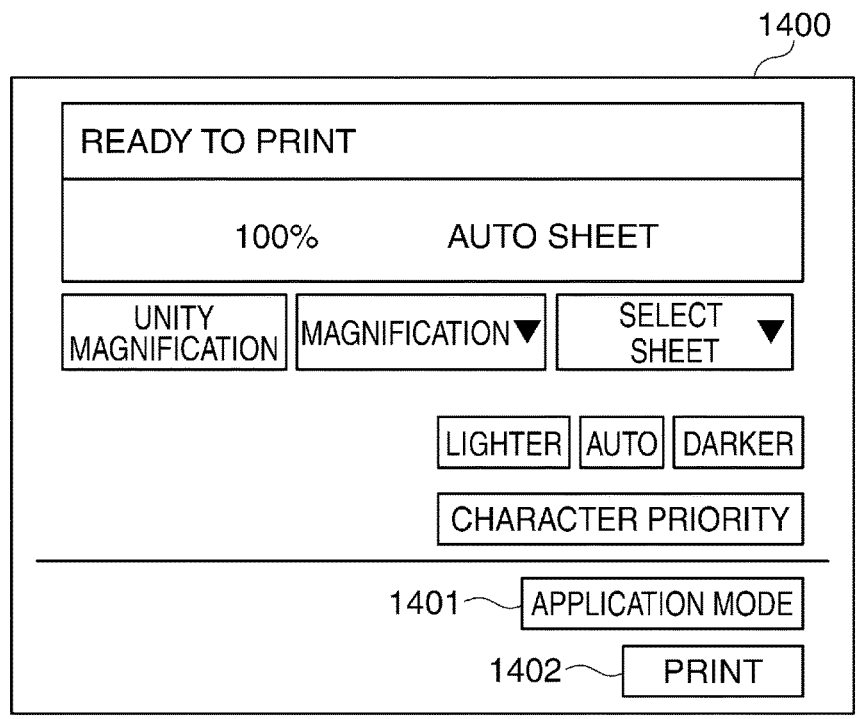
FIG. 14 is a view showing a print setting screen displayed on the touch panel display unit when data is selected in the data list screen in FIG. 13.
Figure 15:
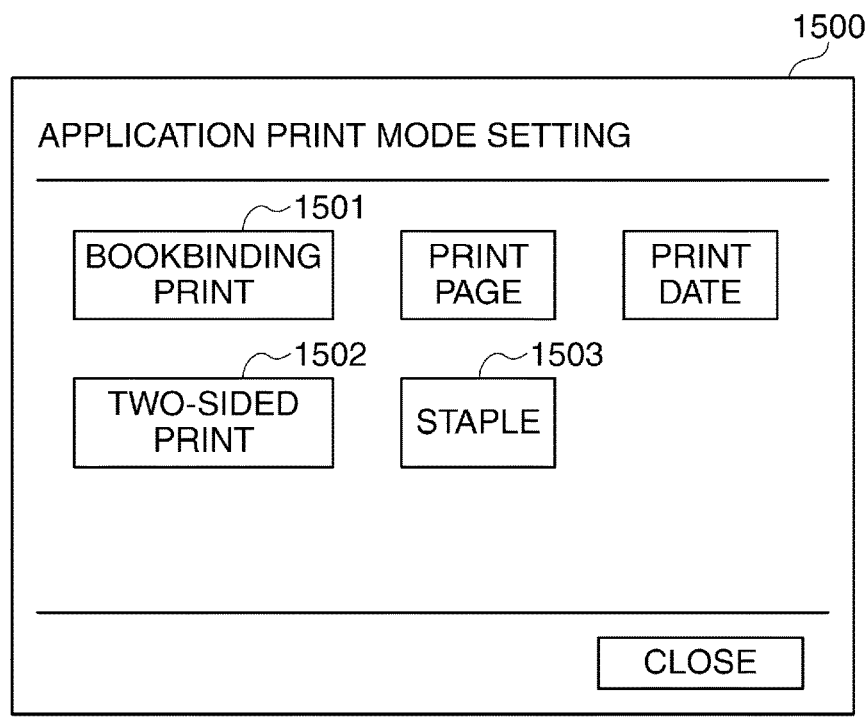
FIG. 15 is a view showing an application print mode setting screen displayed on the touch panel display unit when an application mode button in the print setting screen in FIG. 14 is pressed.
Figure 16:
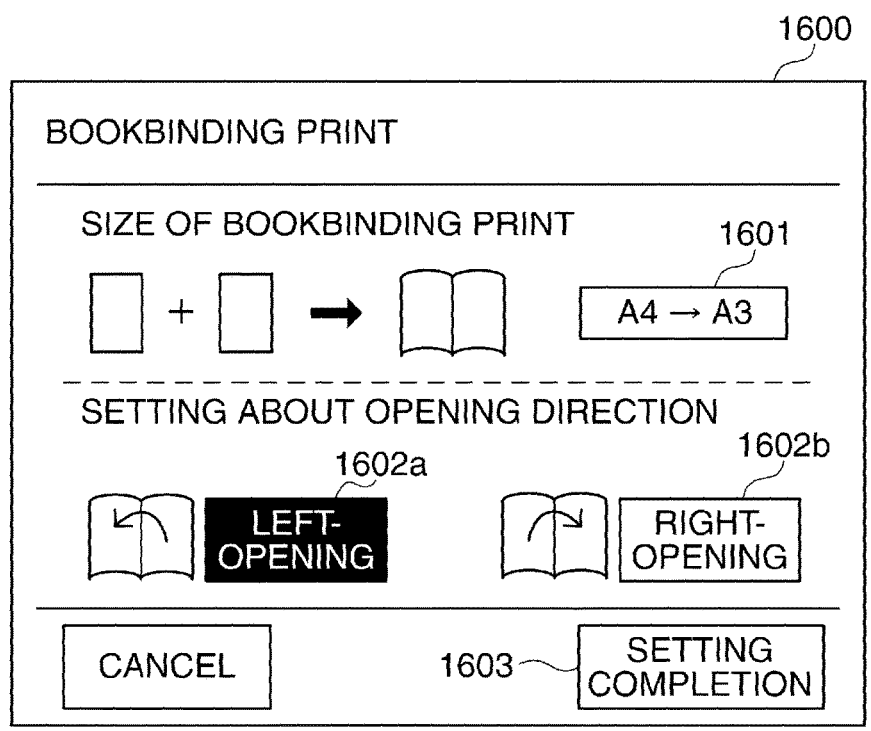
FIG. 16 is a view showing a bookbinding print setting screen displayed on the touch panel display unit when a bookbinding print button in the application print mode setting screen in FIG. 15 is pressed.

When the data 1301 is selected, a print setting screen 1400 (FIG. 14) is displayed on the touch panel display unit 102 (step S1104), and it is determined whether an application mode button 1401 in the print setting screen 1400 is pressed (step S1105). As a result of the determination in the step S1105, when the application mode button 1401 is not pressed, this process finishes. When the application mode button 1401 is pressed, an application print mode setting screen 1500 (FIG. 15) is displayed on the touch panel display unit 102 (step S1106), and it is determined whether a bookbinding print button 1501 is pressed (step S1107). As a result of the determination in the step S1107, when the bookbinding print button 1501 is not pressed, this process finishes. When the bookbinding print button 1501 is pressed, a bookbinding print setting screen 1600 (FIG. 16) is displayed on the touch panel display unit 102 (step S1108).

The bookbinding print setting screen 1600 is provided with a size indication column 1601, selection buttons 1602a and 1602b, and a setting completion button 1603. The size indication column 1601 indicates that the image data of the originals read as the A4-size originals will be printed on an A3-size recording sheet, for example. The selection buttons 1602a and 1602b shows the opening direction of the post-rebinding booklet. In this case, when the bookbinding print setting screen 1600 is displayed on the touch panel display unit 102, the selection button 1602a or the selection button 1602b is beforehand highlighted on the basis of the booklet opening direction associated with the image data of the originals of the data 1301.

When the booklet opening direction is not associated with the data selected in the data list screen 1300, the opening direction, which is beforehand set up as a default value, is highlighted. The opening direction of the post-rebinding booklet to be bound is set up when the user presses the selection button 1602a or the selection button 1602b, On the other hand, when the user does not press the selection button 1602a nor the selection button 1602b, the opening direction corresponding to the selection button 1602a or the selection button 1602b that is highlighted is set up as the opening direction of the post-rebinding booklet. When the setting completion button 1603 is pressed, the print setting screen 1400 is displayed on the touch panel display unit 102 again.

Referring back to FIG. 11, it is determined whether the setting completion button 1603 is pressed (step S1109). As a result of the determination in the step S1109, when the setting completion button 1603 is not pressed, this process finishes. When the setting completion button 1603 is pressed, the print setting screen 1400 is displayed on the touch panel display unit 102 again, and it is determined whether the print button 1402 in the print setting screen 1400 is pressed (step S1110).

As a result of the determination in the step S1110, when the print button 1402 is not pressed, this process finishes.

When the print button 1402 is pressed, the image processing control module 205 determines a print layout on the basis of the size of the printed sheet, the original size, the opening direction of the post-rebinding booklet, and the bookbinding method (only the saddle stitch bookbinding can be set in the process in FIG. 11), which are set up through the bookbinding print setting screen 1600, the page numbers of the image data given in the step S311 in FIG. 3, etc., and generates the image data for printing (step S1111). After that, the printing process control module 204 prints the generated image data onto pages of unprinted sheets (step S1112), applies the saddle stitch bookbinding process to the original bundle as a bundle of the recording sheets that the image data are printed on pages (step S1113), and finishes this process.

According to the process in FIG. 11, the opening direction of the post-rebinding booklet is set up on the basis of the booklet opening direction associated with the image data of the originals of the selected data 1301 (YES in the step S1109), and the print layout is determined on the basis of the set-up opening direction of the post-rebinding booklet (step S1111). Since the booklet opening direction associated with the image data of the originals of the selected data 1301 is set up when the user recognizes the opening direction of the pre-rebinding booklet, it corresponds to the opening direction of the pre-rebinding booklet, i.e., the correct opening direction. As a result, the booklet of the correct opening direction is obtained using the print layout generated on the basis of the set-up opening direction of the post-rebinding booklet.

Figure 17:
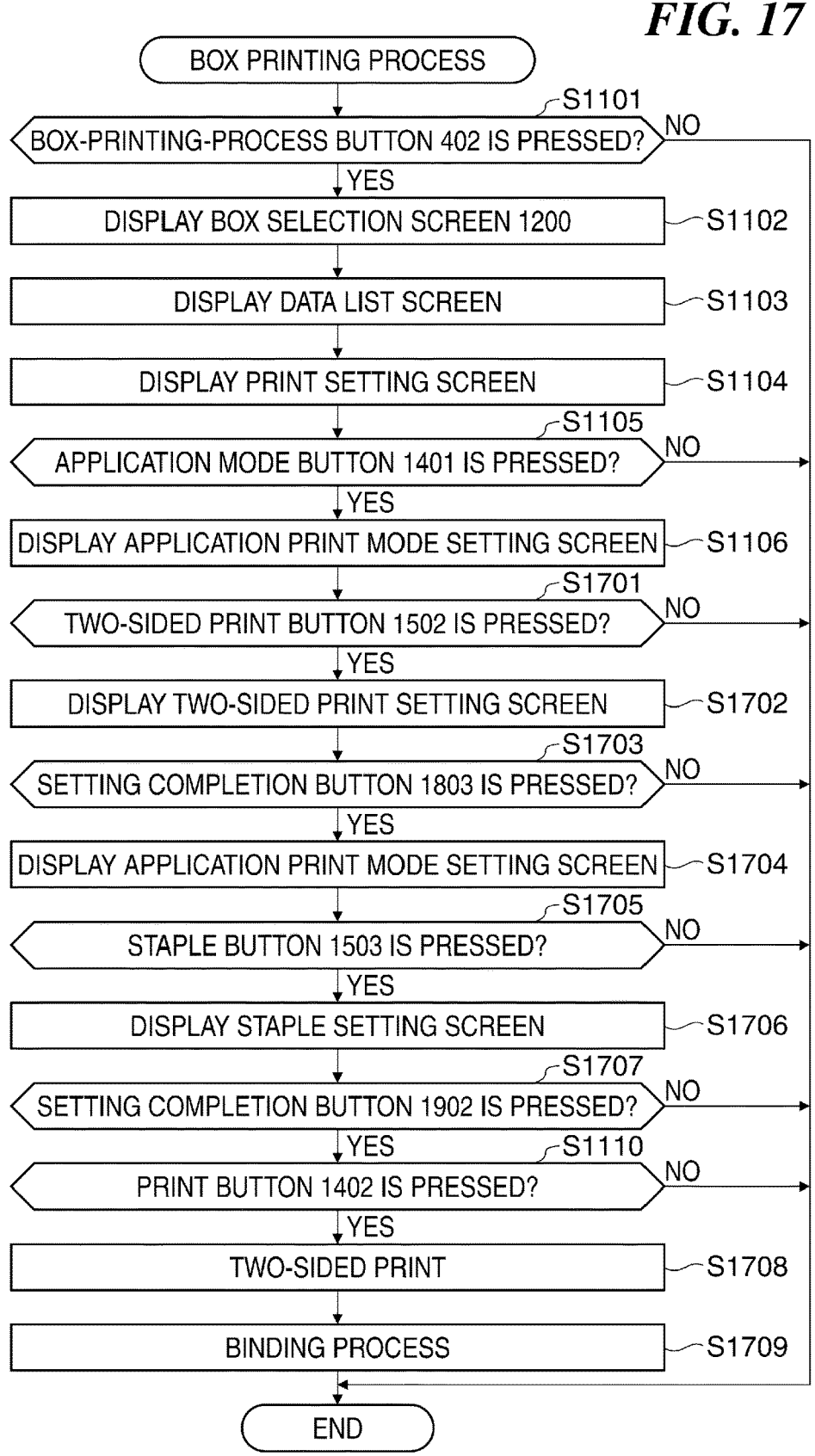
FIG. 17 is a flowchart showing procedures of a variation of the box printing process in FIG. 11.

FIG. 17 is a flowchart showing procedures of a variation of the box printing process in FIG. 11.

Since the procedures in steps S1101 through S1106 and S1110 in FIG. 17 are identical to the procedures in the steps S1101 through S1106 and S1110 in FIG. 11, only the points different from the process in FIG. 11 will be described. Although only the saddle stitch bookbinding is able to be set up as a bookbinding method for a post-rebinding booklet in the process in FIG. 11, only a right-bound bookbinding or a left-bound bookbinding is able to be set up as a bookbinding method of a post-bookbinding booklet in the process in FIG. 17.

Figure 18:
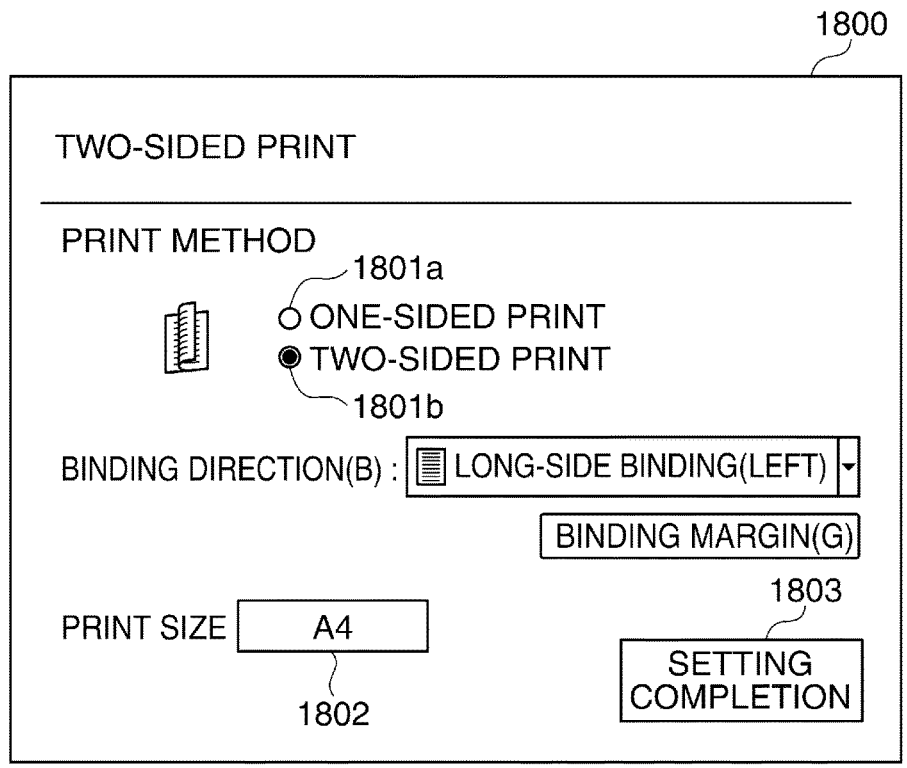
FIG. 18 is a view showing a two-sided print setting screen displayed on the touch panel display unit when a two-sided print button in the application print mode setting screen in FIG. 15 is pressed.

As shown in FIG. 17, the application print mode setting screen 1500 (FIG. 15) is displayed on the touch panel display unit 102 (step S1106), and it is determined whether a two-sided print button 1502 is pressed (step S1701). As a result of the determination in the step S1701, when the two-sided print button 1502 is not pressed, this process finishes. When the two-sided print button 1502 is pressed, a two-sided print setting screen 1800 (FIG. 18) is displayed on the touch panel display unit 102 (step S1702).

The two-sided print setting screen 1800 is provided with radio buttons 1801*a* and 1801*b*, a printing size display column 1802, and a setting completion button 1803. When the radio button 1801*a* is selected, image data are printed only on a front side of a recording sheet that has a front side and a back side. Moreover, when the radio button 1801*b* is selected, image data are printed on both sides of a recording sheet that has a front side and a back side. A size of a recording sheet used for printing is displayed in the printing size display column 1802.

When the setting completion button 1803 is pressed, the application print setting screen 1500 (FIG. 15) is displayed on the touch panel display unit 102 again.

Referring back to FIG. 17, it is determined whether the setting completion button 1803 is pressed (step S1703). As a result of the determination in the step S1703, when the setting completion button 1803 is not pressed, this process finishes. When the setting completion button 1803 is pressed, the application print mode setting screen 1500 is displayed on the touch panel display unit 102 (step S1704).

Figure 19:
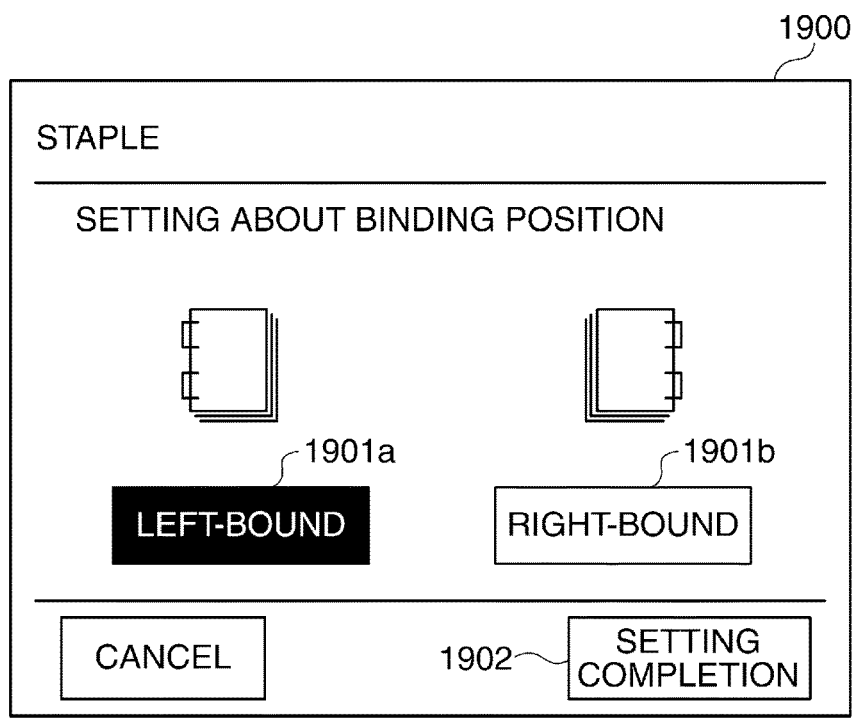
FIG. 19 is a view showing a staple setting screen displayed on the touch panel display unit when a staple button in the application print mode setting screen in FIG. 15 is pressed.
Figure 20A:
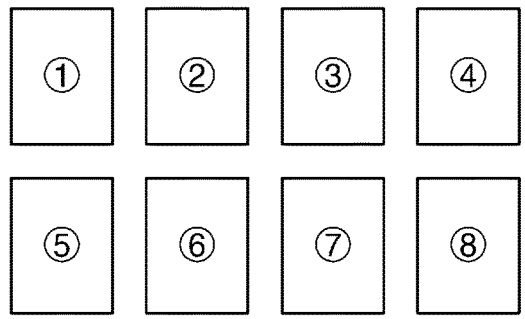
FIG. 20A through FIG. 20F are views used to describe a bookbinding process in which image data are printed onto recording sheets and the recording sheets on which the image data are printed are bound.
Figure 20B:
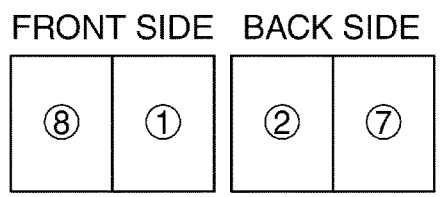
Figure 20C:
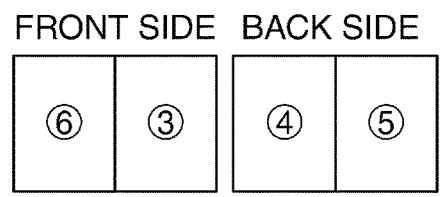
Figure 20D:
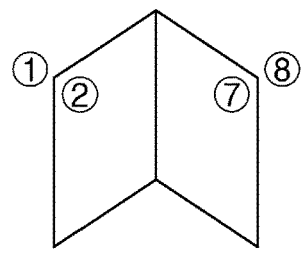
Figure 20E:
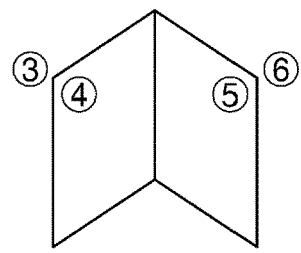
Figure 20F:
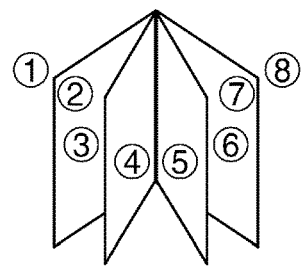
Figure 21:
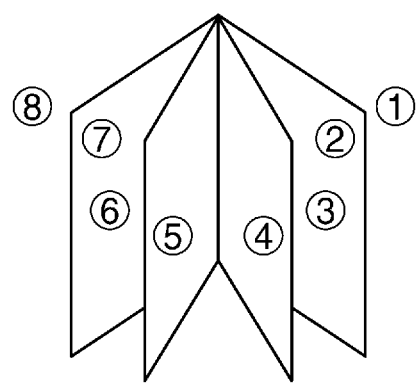
FIG. 21 is a view used to describe how to open a bound booklet.
Figure 22A:
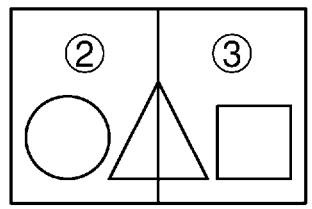
FIG. 22A and FIG. 22B are views used to describe a difference between spread pages of a right-opening bound booklet and spread pages of a left-opening bound booklet.
Figure 22B:
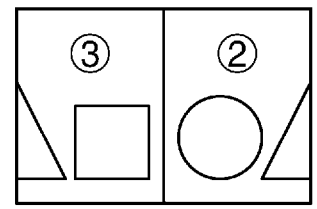

Next, it is determined whether a staple button 1503 in the application print mode setting screen 1500 is pressed (step S1705). As a result of the determination in the step S1705, when the staple button 1503 is not pressed, this process finishes. When the staple button 1503 is pressed, a staple setting screen 1900 (FIG. 19) is displayed on the touch panel display unit 102 (step S1702).

The staple setting screen 1900 is provided with binding position setting button 1901*a* and 1901*b*, and a setting completion button 1902. When the binding position setting button 1901*a* is selected, a left-bound bookbinding is set up as a bookbinding method of a post-bookbinding booklet, and a left end of an original bundle is bound with staples. When the binding position setting button 1901*b* is selected, a right-bound bookbinding is set up as a bookbinding method of a post-bookbinding booklet, and a right end of an original bundle is bound with staples.

When the staple setting screen 1900 is displayed on the touch panel display unit 102, one of the binding position setting button 1901*a* and the binding position setting button 1901*b* that should be selected is highlighted on the basis of the booklet opening direction associated with the image data of the originals of the data 1301 selected in the step S1103.

Incidentally, the opening direction of a left-bound booklet is left-opening, and the opening direction of a right-bound booklet is right-opening. Accordingly, when a pre-rebinding booklet is a left-opening booklet, it is natural that a left-bound bookbinding is set up as a bookbinding method of a post-rebinding booklet that will be rebound from the pre-rebinding booklet. In the same manner, when a pre-rebinding booklet is a right-opening booklet, it is natural that a right-bound bookbinding is set up as a bookbinding method of a post-rebinding booklet that will be rebound from the pre-rebinding booklet.

Consequently, when the booklet opening direction associated with the image data of the original of the data selected in the data list screen 1300 defines the left-opening, the binding position setting button 1901*a* is highlighted beforehand in the process in FIG. 17. Moreover, when the booklet opening direction associated with the image data of the original of the data selected in the data list screen 1300 defines the right-opening, the binding position setting button 1901*b* is highlighted beforehand.

When the booklet opening direction is not associated with the data selected in the data list screen 1300, the opening direction, which is beforehand set up as a default value, is highlighted. The opening direction of the post-rebinding booklet to be bound is set up when the user presses the binding position setting button 1901*a* or the binding position setting button 1901*b*, On the other hand, when the user does not press the binding position setting button 1901*a* nor the binding position setting button 1901*b*, the binding position corresponding to the binding position setting button 1901*a* or the binding position setting button 1901*b* highlighted is set up as the binding position of the post-rebinding booklet.

In the process in FIG. 17, since the booklet opening direction associated with the image data of the original of the data 1301 is the left-opening, the binding position setting button 1901*a* shall be selected and set up. After that, when the setting completion button 1902 is pressed, the print setting screen 1400 is displayed on the touch panel display unit 102 again.

Referring back to FIG. 17, it is determined whether the setting completion button 1902 is pressed (step S1707). As a result of the determination in the step S1707, when the setting completion button 1902 is not pressed, this process finishes. When the setting completion button 1902 is pressed, the process proceeds to step S1110. After that, as a result of the determination in the step S1110, when the print button 1402 is pressed, the printing process control module 204 prints the image data to both sides of unprinted sheets, and obtains an original bundle as a printed result (step S1708).

Incidentally, when a post-rebinding booklet is bounded by the saddle stitch bookbinding, it is necessary to change a printing order of image data of originals onto unprinted sheets according to an opening direction (right-opening or left-opening) in order to obtain an original bundle. When a post-rebinding booklet is a left binding booklet or a right binding booklet, image data of originals can be printed onto unprinted sheets in order according to page numbers. In the process in FIG. 17, the eight image data to which the page numbers 1 through 8 are given are printed as follows. The image data of the page number 1 and the image data of the page number 2 are respectively printed on the front side and the back side of the first unprinted sheet. The image data of the page number 3 and the image data of the page number 4 are respectively printed on the front side and the back side of the second unprinted sheet. The image data of the page number 5 and the image data of the page number 6 are respectively printed on the front side and the back side of the third unprinted sheet. The image data of the page number 7 and the image data of the page number 8 are respectively printed on the front side and the back side of the fourth unprinted sheet.

Next, the staple process control module 206 binds the left end of the obtained original bundle with staples to obtain the post-rebinding booklet (step S1709), and this process finishes.

In general, a left-opening booklet and a left-bound booklet open from left, and a right-opening booklet and a right-bound booklet open from right. Since the binding position of the post-rebinding booklet is set up on the basis of the booklet opening direction associated with the image data of originals of the selected data 1301 (step S1706) according to the process in FIG. 17, the opening direction of the post-rebinding booklet becomes natural.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-048184, filed Mar. 11, 2015, which is hereby incorporated by reference herein in its entirety.

What is claimed is:

1. An image forming apparatus comprising:
a reader configured to read an original having a plurality of pages;
a storage device configured to store data;
a display device configured to display information;
an image forming device configured to form images on a sheet; and
a controller, having a processor that executes instructions stored in a memory or having circuitry, configured to:
obtain an opening direction of the original read by the reader, based on a user instruction, the original being for a booklet to which a saddle stitch bookbinding is applied;
store, in the storage device, print data of a plurality of images generated based on the plurality of pages of the original read by the reader and the opening direction of the original, the plurality of images being printable by the image forming device;
receive a selection of images to be printed, from among the plurality of images, based on a user instruction;
display a plurality of opening directions on the display device as a setting screen about bookbinding print of the selected images, with the stored opening direction initially selected among the displayed plurality of opening directions;
receive a selection of an opening direction based on a user instruction from among the displayed plurality of opening directions;
determine a print layout based on the received selection of the opening direction; and
cause, in a case where the saddle stitch bookbinding is applied, the image forming device to form the selected images according to the determined print layout.

2. The image forming apparatus according to claim 1, wherein the plurality of opening directions include left-opening and right-opening directions.

3. The image forming apparatus according to claim 1, wherein:
the setting screen includes a plurality of selectable objects showing candidates of the opening direction used when the plurality of pages are read by the reader, and
the controller causes the display device to display, based on the opening direction of the original, the setting screen under a condition where an object showing a specified opening direction is selected from the plurality of selectable objects.

4. The image forming apparatus according to claim 3, wherein the controller causes the display device to display, when the opening direction of the original is not stored, the setting screen under a condition where an object showing a predetermined opening direction is selected from the plurality of selectable objects.

5. A control method for an image forming apparatus comprising a reader configured to read an original having a plurality of pages, a storage device configured to store data, a display device configured to display information, and an image forming device configured to form images on a sheet, the control method comprising the steps of:

obtaining an opening direction of the original read by the reader, based on a user instruction, the original being for a booklet to which a saddle stitch bookbinding is applied;

storing, in the storage device, print data of a plurality of images generated based on the plurality of pages of the original read by the reader and the opening direction of the original, the plurality of images being printable by the image forming device;

receiving a selection of images to be printed, from among the plurality of images, based on a user instruction;

displaying a plurality of opening directions on the display device as a setting screen about bookbinding print of the selected images, with the stored opening direction initially selected among the displayed plurality of opening directions;

receiving a selection of an opening direction based on a user instruction from among the displayed plurality of opening directions;

determining a print layout based on the received selection of the opening direction; and causing, in a case where the saddle stitch bookbinding is applied, the image forming device to form the selected images according to the determined print layout.

6. A non-transitory computer-readable storage medium storing a computer program executable by a computer to execute a control method for an image forming apparatus comprising a reader configured to read an original having a plurality of pages, a storage device configured to store data, a display device configured to display information, and an image forming device configured to form images on a sheet, the control method comprising the steps of:

obtaining an opening direction of the original read by the reader, based on a user instruction, the original being for a booklet to which a saddle stitch bookbinding is applied;

storing, in the storage device, print data of a plurality of images generated based on the plurality of pages of the original read by the reader and the opening direction of the original, the plurality of images being printable by the image forming device;

receiving a selection of images to be printed, from among the plurality of images, based on a user instruction;

displaying a plurality of opening directions on the display device as a setting screen about bookbinding print of the selected images, with the stored opening direction initially selected among the displayed plurality of opening directions;

receiving a selection of an opening direction based on a user instruction from among the displayed plurality of opening directions; and determining a print layout based on the received selection of the opening direction; and causing, in a case where the saddle stitch bookbinding is applied, the image forming device to form the selected images according to the determined print layout.

7. An image forming apparatus that uses a reader configured to read an original having a plurality of pages, a storage device configured to store data, a display device configured to display information, and an image forming device configured to form images on a sheet, the image forming apparatus comprising:

a controller, having a processor that executes instructions stored in a memory or having circuitry, configured to:

obtain an opening direction of the original read by the reader, based on a user instruction, the original being for a booklet to which a saddle stitch bookbinding is applied;

store, in the storage device, print data of a plurality of images generated based on the plurality of pages of the original read by the reader and the opening direction of the original, the plurality of images being printable by the image forming device;

receive a selection of images to be printed, from among a plurality of images, based on a user instruction;

display a plurality of opening directions on the display device as a setting screen about bookbinding print of the selected images, with the stored opening direction initially selected among the displayed plurality of opening directions;

receive a selection of an opening direction based on a user instruction from among the displayed plurality of opening directions;

determine a print layout based on the received selection of the opening direction; and cause, in a case where the saddle stitch bookbinding is applied, the image forming device to form the selected images according to the determined print layout.

* * * * *